Figure 1:
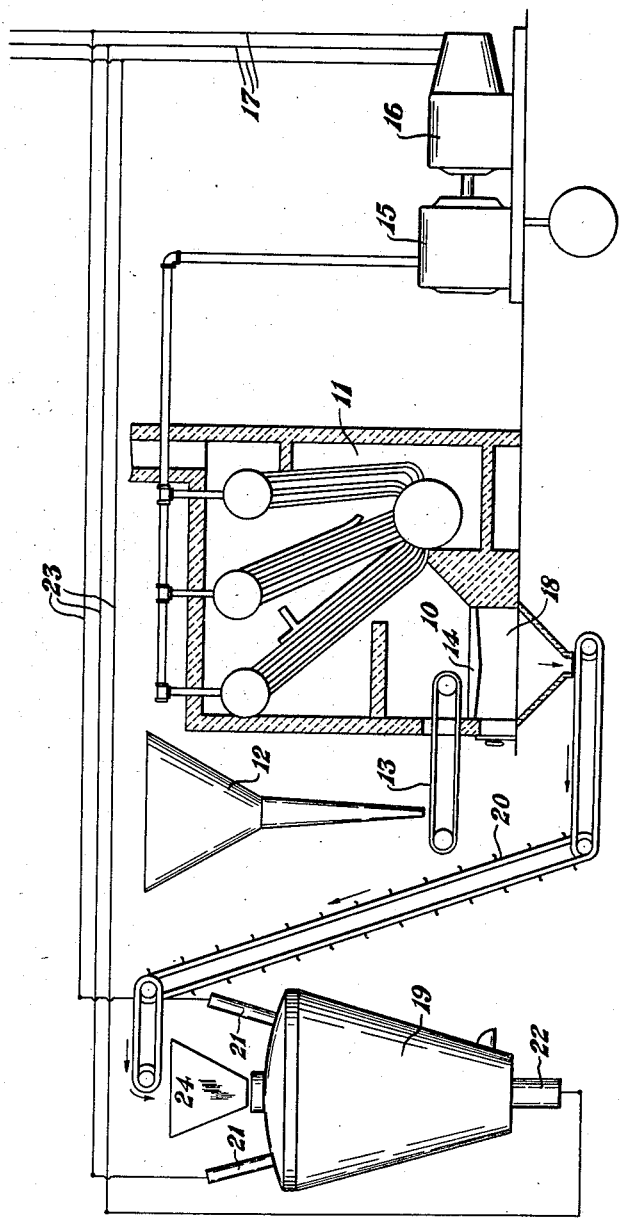

July 28, 1931. T. F. BAILY 1,815,888
METHOD OF RECOVERING METALS AND OXIDES FROM BOILER ASH
Filed April 2, 1929 2 Sheets-Sheet 1

Inventor
*T. F. Baily*
By *Harry Frease*
Attorney

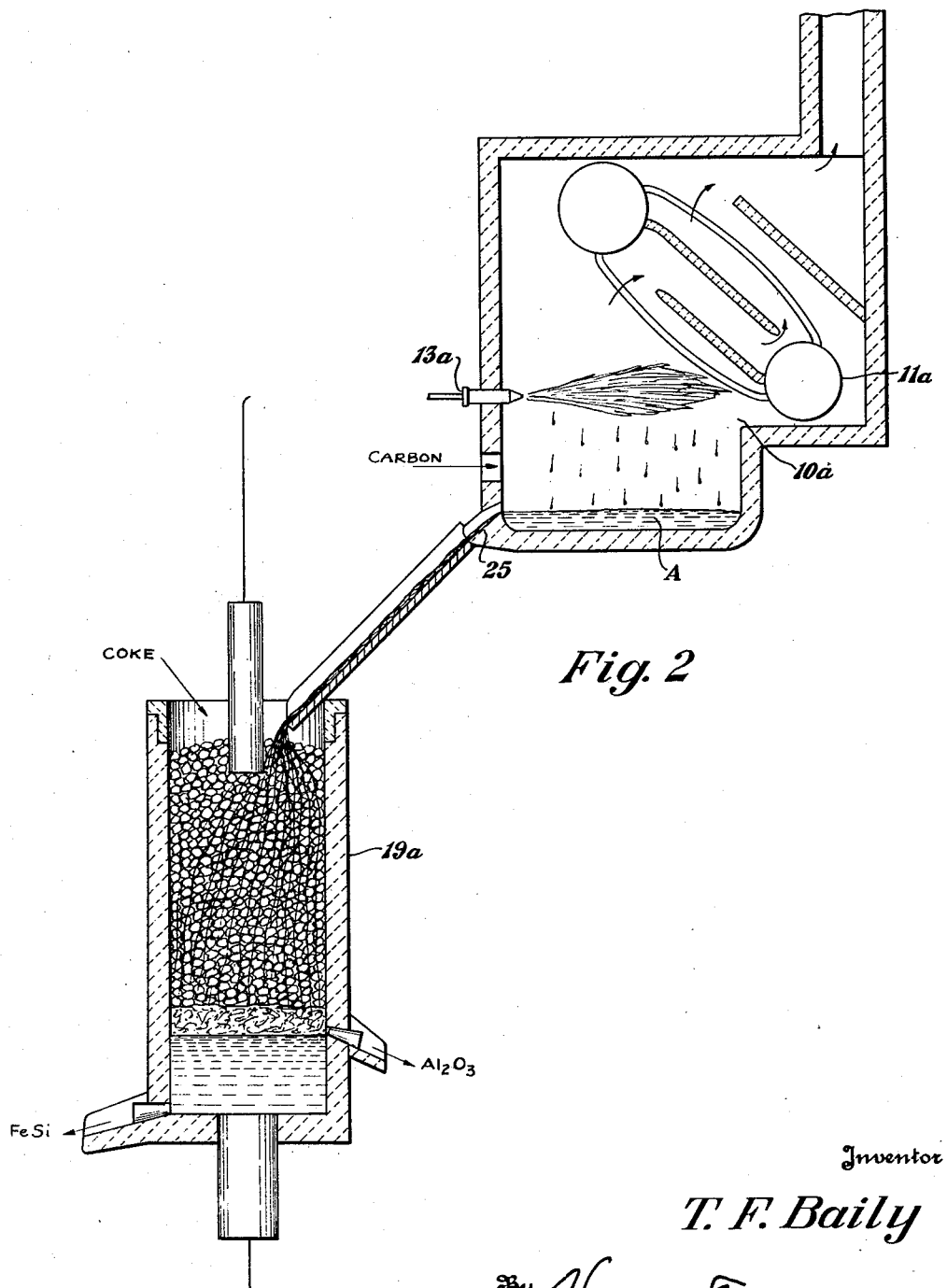

Patented July 28, 1931

1,815,888

UNITED STATES PATENT OFFICE

THADDEUS F. BAILY, OF ALLIANCE, OHIO

METHOD OF RECOVERING METALS AND OXIDES FROM BOILER ASH

Application filed April 2, 1929. Serial No. 351,928.

The invention relates to the recovery of valuable metals and oxides from boiler ash which under present practice is a waste product, and more particularly to the production of ferro-silicon and alumina from the boiler ash.

In the operation of ordinary coal fired power stations, the ash usually represents about ten per cent by weight of the coal fired and generally contains $SiO_2$, $Al_2O_3$, and $Fe_2O_3$ or iron in other form, as well as some unconsumed carbon.

These power plants comprise generally a coal fired boiler, which operates a turbine, which drives the generator to produce the electric current.

The ash resulting from the combustion of the coal is refuse entailing a considerable expense in its removal from the plant site, especially where power houses are located in congested areas and there is no convenient dumping ground, and these accumulations of ash are oftentimes of considerable annoyance and involve extra expense for land.

The object of the present invention is to provide a method for working up substantially all of the boiler ash into valuable and readily marketable products the iron or iron oxide and the silica being reduced to ferro-silicon, leaving the alumina as a slag from said reduction operation, in a purified condition as a refractory.

If desired, a portion of the silica may be retained in the slag, producing a lower percentage of silica in the ferro-silicon and a silica alumina refractory of any desired analysis; or the iron alone, or with only a small percentage of silicon reduced, controlled by the temperature of the reduction operation and the amount of carbon present, may be made into a pig iron with a low silicon content.

The improved method may be carried out by the use of an apparatus such as illustrated in the accompanying drawings, in which Figure 1 is a diagrammatic view of a power plant showing an electric furnace associated therewith and operated by current generated from the power plant, to reduce the metals and oxides from the ash; and Fig. 2 a similar view of a slightly different arrangement of the apparatus whereby a portion of the reduction operation may be carried on in the boiler furnace of the power plant.

Similar numerals refer to similar parts throughout the drawings.

In the operation of a typical power station of 250,000 kilowatts capacity, fired with bituminous coal, such as the power station now in operation at Philo, Ohio, approximately 4,000 tons of coal are required per day and about 400 tons of ash are produced per day.

A typical analysis of the ash obtained from Ohio bituminous coal such as used in said power station is as follows:

|  | Per cent |
|---|---|
| $SiO_2$ | 36.36 |
| $Fe_2O_3$ | 26.74 |
| $Al_2O_3$ | 21.94 |
| $CaO$ | 3.03 |
| $MgO$ | 1.08 |
| Sodium and potassium oxides | .34 |
| $MnO_2$ | .22 |
| $SO_3$ | 1.29 |
| $P_2O_5$ | .13 |
| $C$ | 8.87 |
| Total | 100.00 |
| Ignition loss | 6.5 |

From 400 tons of ash of the above analysis there may be recovered substantially 150 tons of 48 per cent ferro-silicon and 120 tons of slag residue containing 80 per cent $Al_2O_3$ which may be ground and used as a refractory or cast directly into shapes for refractory material.

In Fig. 1 is shown conventionally a power station having associated therewith apparatus for recovering the valuable metals and oxides from the ash produced by the boiler furnace 10 of the usual steam boiler shown generally at 11. Coal, from the hopper 12, may be fed, by the conveyer 13, to the grate bars 14 of the boiler furnace.

The boiler is arranged to operate a turbine 15 which drives a generator 16, producing current in the line wires 17. The boiler ash from the ash pit 18 of the boiler furnace may be conveyed therefrom to the electric furnace 19 by any suitable means such as the conveyer 20; and the upper and lower electrodes 21 and 22 respectively, of the electric furnace, may be connected in circuit with the line wires 17, as indicated at 23.

If desired, carbon, additional to that contained in the boiler ash, may be also charged into the hopper 24 of the electric furnace in suitable proportion to the amount of ash charged therein, depending upon the analysis of the ash and the percentage of silicon desired in the ferro-silicon to be reduced therefrom.

The boiler ash, with or without the added carbon, is melted and reduced in the furnace, producing the pig iron or ferro-silicon of desired silicon content, this being controlled by the temperature and amount of carbon introduced, leaving a slag which is high in $Al_2O_3$.

It will be seen that in a steam electric station of the character illustrated, with a small portion of the power generated from the fuel fired, all of the boiler ash produced by the combustion of the fuel may be treated and put into highly valuable and marketable products so that after deducting the electrical energy required for the ash treating operation, most of the electrical energy produced from the fuel is available for outside sale.

It will also be obvious that the presence of calcium in the slag furnishes a slagging constituent for the elimination or reduction of sulphur and phosphorus. Further, it will be seen that since it has been found advisable, in boiler plant operation, to so operate the boilers that the fuel will be slightly under complete combustion of all the carbon therein rather than to have an excess of air, the carbon remaining in the fuel ash is recovered and used in this method.

It has been found by actual test with ash of the analysis given above that without the addition of any carbon to that already contained in the ash, ferro-silicon above 20 per cent can be produced, and that with the addition of more carbon in the reduction furnace, ferro-silicons above 40 per cent have been produced, the slag in the latter case containing about 67 per cent $Al_2O_3$ and 26 per cent $SiO_2$.

By additional temperature and carbon, ferro-silicon can be produced of substantially 50 per cent silicon content, taking substantially all of the $SiO_2$ out of the slag and reducing the silicon to metal, and leaving the residual slag containing substantially 80 per cent $Al_2O_3$.

As shown in Fig. 2, where the boiler is fired with pulverized fuel, the ash may be collected in a molten condition in the bottom of the boiler furnace in close proximity to the flame as indicated at A. In this figure, the boiler furnace is indicated generally at 10a, the boiler at 11a and the powdered fuel feeding means at 13a.

Carbon may be added to this molten bath substantially without any loss of heat from the flame, part of the reduction operation being performed in the boiler furnace itself.

This molten, partly reduced ash may then be withdrawn through the pouring spout 25 to an electric furnace 19a where the reduction operation is completed.

In the same manner it will be seen that the ash may be first placed in a fuel fired furnace for partial reduction and then conveyed to the electric furnace.

Such final operation or complete reduction may thus be carried on by the electric furnace, requiring less electrical power than where the ash must be melted electrically as shown in Fig. 1.

From the above it will be obvious that the ash, which is now a waste product requiring trouble and expense to dispose of the same, may be reduced to valuable metals and oxides at a slight cost, and by the use of the electric energy generated by the burning of the fuel, thus disposing of the ash and producing material having a value almost sufficient to pay for the fuel consumed in the boiler furnace.

I claim:

1. The method of treating carbonaceous fuel residue containing carbon in a powdered coal fired boiler furnace having a chamber for holding molten ash maintained in a fluid condition by the flame in the boiler furnace, which consists in adding a reducing agent to the molten ash to partially reduce the metals and oxides contained therein, transferring the partially reduced product in molten condition to an electric furnace and finally reducing and refining the same in the electric furnace.

2. The method of treating carbonaceous fuel residue containing carbon in a powdered coal fired boiler furnace having a chamber for holding molten ash maintained in a fluid condition by the flame in the boiler furnace, which consists in adding a reducing agent to the molten ash to partially reduce the metals and oxides contained therein and finally reducing and refining the same in an electric furnace.

In testimony that I claim the above, I have hereunto subscribed my name.

THADDEUS F. BAILY.